Jan. 15, 1957 D. KRONHAUS ET AL 2,777,625
CARGO CARRYING ATTACHMENT FOR AUTOMOBILE
Filed Oct. 4, 1954 2 Sheets-Sheet 1
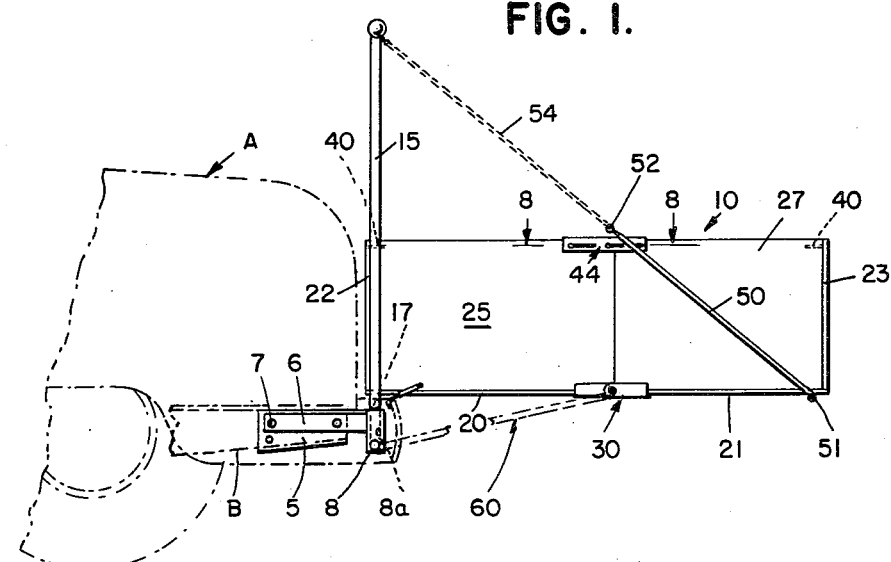
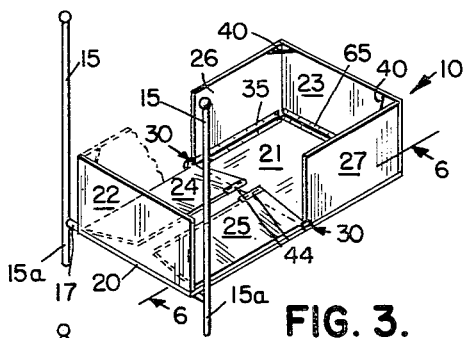
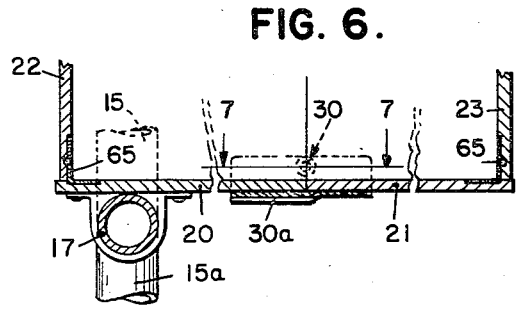
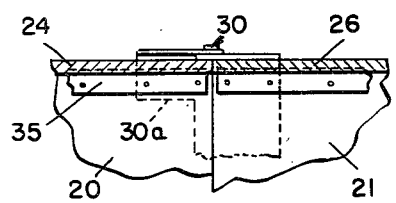
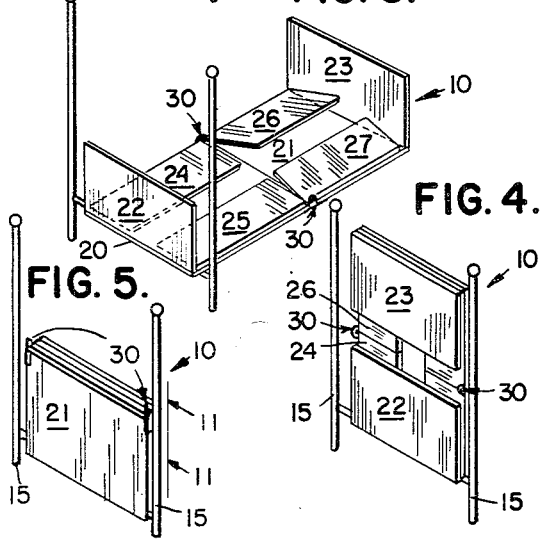
INVENTORS
DINA KRONHAUS
LUBA LIFSCHUTZ
BY Mason & Graham
ATTORNEYS Jan. 15, 1957    D. KRONHAUS ET AL    2,777,625
CARGO CARRYING ATTACHMENT FOR AUTOMOBILE
Filed Oct. 4, 1954    2 Sheets-Sheet 2

INVENTORS
DINA KRONHAUS
LUBA LIFSCHUTZ
BY
*Mason & Graham*
ATTORNEYS

United States Patent Office 2,777,625
Patented Jan. 15, 1957

2,777,625

CARGO CARRYING ATTACHMENT FOR AUTOMOBILE

Dina Kronhaus and Luba M. Lifschutz, Los Angeles, Calif.

Application October 4, 1954, Serial No. 459,948

3 Claims. (Cl. 224—42.43)

Our invention has to do with cargo carrying attachments for automobiles.

Conventional cargo carrying devices for automobiles are in the form of trailers which require supporting wheels and impart a considerable drag to the towing vehicle. Also, such trailers are not of a form which is susceptible of being folded into compact form for storage purposes when not being used.

It is an object of our invention to provide a cargo carrying attachment for an automobile which does not require supporting wheels.

It is a further object to provide an attachment of this character which may be readily folded into compact form when not in use.

A further object is to provide an attachment of this character which may be folded into smaller form so as to provide a cargo carrier of relative small capacity when only a small capacity carrier is needed.

Another object of our invention is to provide an attachment of this character which may be easily attached to and removed from an automobile.

A still further object is to provide an attachment of this character whose attaching means are adjustable in width to render the device adjustable to automobiles of different width.

Additional objects and advantages will appear hereinafter.

While we point out in the appended claims the features of our invention which we believe to be new, we shall now, for the purposes of explanation, describe presently preferred embodiments thereof, for which purpose we shall refer to the accompanying drawings, wherein:

Fig. 1 is a side elevation of our attachment mounted on an automobile;

Figs. 2, 3, 4, and 5, respectively, are perspective views showing our attachment in different stages of being folded into and/or unfolded from its collapsed form;

Fig. 6 is an enlarged section taken on line 6—6 of Fig. 2;

Fig. 7 is an enlarged view taken on line 7—7 of Fig. 6;

Figure 8:
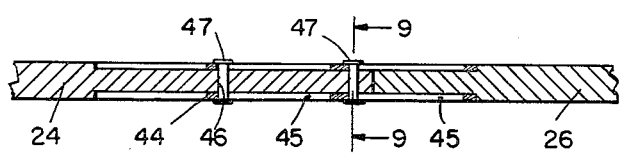
Fig. 8 is an enlarged section taken on line 8—8 of Fig. 1.

Referring now to the drawings, the reference letter A denotes a conventional automobile body and B denotes one of the side members of the chassis frame which normally projects rearwardly of the rear axle in a conventional automobile. To each of the members B of an automobile we secure a bracket 5. An arm 6 is affixed to the bracket, as by bolts or rivets 7, the arm terminating rearwardly in a vertical sleeve portion 8 having a vertical bore 8a.

Our cargo carrying attachment is generally denoted by the numeral 10 and has upright inner end posts 15, one at each side. A cross bar 17 is secured at its ends to the respective posts 15 adjacent but spaced above the bottom ends of the latter, so that the bottom end portions 15a of the posts may be inserted in the sleeves 8.

The body portion of our carrier comprises bottom walls or plates 20, 21, end walls or plates 22, 23, and two pairs of side walls or plates 24, 25 and 26, 27.

As best shown in Figs. 6 and 7, the contiguous end edge portions of bottom plates 20, 21 are hingedly secured together by a hinge member 30 which breaks downwardly and one of the hinge portions has an extension plate 30a which extends into the position underlying and engaging bottom plate 20 when the carrier body is in fully opened position (Fig. 1).

Each of the side plates is secured to one of the bottom plates by a hinge 35 whose legs are preferably countersunk in the side and bottom plates, respectively, so as to be flush therewith to facilitate the folding.

Figure 10:
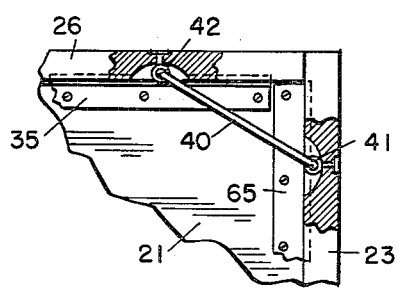
Fig. 10 is an enlarged plan of a rear corner joint.

When the carrier is in the position of Fig. 1, ready to be loaded with cargo, the side and end walls, at each corner, are locked in upright position by a link 40 (Fig. 10) which has a looped end engaging an eye member 41 carried by one of said walls, while the other end of the link is formed into a hook portion which engages in an eye member 42 carried by the contiguous wall member.

Figure 9:
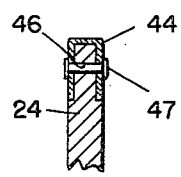
Fig. 9 is a section taken on line 9—9 of Fig. 8.

As shown in Figs. 8 and 9 the contiguous edges of the side plates at each side, when in upright position, are secured together in alignment by a slidable U-shaped yoke 44 slidably fitting over the top edges of said plates and having longitudinal slots 45. One of the plates has openings 46 therethrough and pins 47 extend through said slots and openings. Thus the yoke may slide to and from position engaging both plates.

At each side of the body, we provide a rigid rod 50 pivoted at its lower end to an end of a cross bar 51 extending beneath the bottom plate 21. The upper or free end of each rod 50 is provided with a hole 52 to receive a hook or other fastening element carried by the contiguous end of a chain 54, whose other end is secured to a post 15 so as to better support the outer end of the body. If desired, of course, a rigid rod may be substituted for each chain 54.

Of course, any desired additional appropriate bracing members may be employed to more rigidly support the body from the vehicle to which it is attached. In Fig. 1, we show additional bracing in the form of a rod 60, one at each side of the body, and connected at one end to the sleeve 8 and connected at the other end to rod 51.

Figure 12:
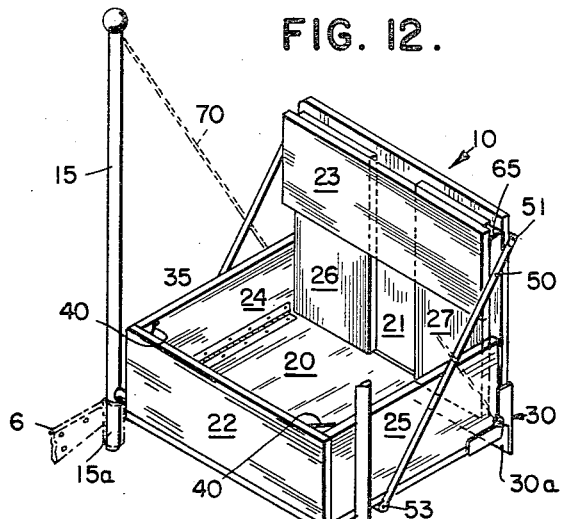
Fig. 12 is a perspective view showing the attachment folded into the position which it occupies when being used as a cargo carrier of relative small capacity.

As shown in Fig. 12 the body of Fig. 1 may be partially folded by first folding the side plates 26, 27 inwardly, thence folding the plate 23 inwardly, and then swinging the rear half of the body upwardly into the position of Fig. 12, in which position it may be retained by connecting the ends of rods 50 to members 51 and 53. In this position it is also preferable to provide rods 70 secured at one end to the posts 15 and secured at the other end to the members 51.

Figure 11:
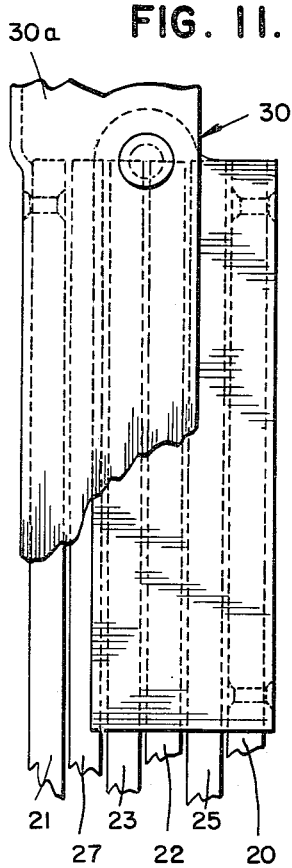
Fig. 11 is an enlarged fragmentary elevation on line 11—11 of Fig. 5.

To completely fold the body into the position of Fig. 11 the side plates 24, 27 are first folded inwardly against the bottom plate and then the end plates 22, 23 are folded inwardly against the previously folded side plates.

The offset of the pintle of each of the hinges 65 permits the end plates to be folded flatly against the folded side plates. Then the front and rear halves are folded into parallel position about hinge 30.

Figures 13, 14:
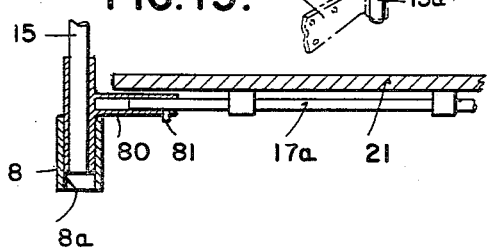
Fig. 13 is a sectional, fragmentary view showing a modification.
Fig. 14 is another sectional, fragmentary view showing a further modification.

In Fig. 13, we show a modification wherein the parts are as before described except that here we provide for adapting the carrier to automobiles of different widths. Here, for each end of the rod 17a extending transversely beneath the front of the body we provide a sleeve or tube 80, which telescopically fits over the respective ends of rod 17, being held in any desired position of adjustment as by a set-screw 81. The outer end of each sleeve 80 is affixed, as by welding, to an upright, rightangularly disposed sleeve 82 which receives the rod 15. Here the bottom end portion of sleeve 82 engages in the bore of the sleeve 8. By virtue of the telescopic relationship of sleeves 80 and rod 17 it is possible to readily adjust the device to fit automobiles of different widths.

While in Figs. 1 to 12, we have described our carrier as utilizing solid walls or plates 20—27, it will be understood, of course, that slatted side, bottom and end walls may be used in lieu of solid walls. In Fig. 14, we show a modified embodiment of this character. Here we show transverse slats 90 and longitudinal slats 92 secured to slats 90. Vertical slats 94 are hinged at 95 to the outermost slats 92 and have secured to them longitudinal slats 96. The relative spacing of slats 92 and 96 is such that when the side walls, formed by slats 94, 96, are folded inwardly against the bottom wall, formed by slats 90—92, the slats 96 will fit between contiguous slats 92, enabling the device to be more compactly folded.

We claim:

1. In a cargo carrying attachment for an automobile, a body composed of a pair of end-to-end arranged bottom wall portions hingedly connected together at their contiguous ends to swing relative to each other, side walls hingedly connected at their bottom edge portions to the side edge portions of said bottom wall members to swing between positions perpendicular to and parallel with said bottom wall members, an end wall hingedly secured at its bottom edge portion to an end portion of one of said bottom wall members, a second end wall hingedly secured at its bottom edge portion to the opposite end portion of said other bottom wall member, said end walls being swingable between positions perpendicular to and parallel with said bottom wall members, means for suspending the inner one of said bottom plates from the chassis of an automobile comprising a pair of brackets attachable to the rear end of the chassis frame of said automobile and each presenting an upwardly disposed sleeve-like portion, a pair of upright posts having their bottom ends fitting in said respective sleeve-like portions, means securing said posts to the inner one of said bottom plate members, and bracing members extending from said posts to the outer one of said bottom plate members.

2. In a cargo carrying attachment for an automobile, a body composed of a pair of end-to-end arranged bottom wall portions hingedly connected together at their contiguous ends to swing relative to each other, side walls hingedly connected at their bottom edge portions to the side edge portions of said bottom wall members to swing between positions perpendicular to and parallel with said bottom wall members, an end wall hingedly secured at its bottom edge portion to an end portion of one of said bottom wall members, a second end wall hingedly secured at its bottom edge portion to the opposite end portion of said other bottom wall member, said end walls being swingable between positions perpendicular to and parallel with said bottom wall members, means for suspending the inner one of said bottom plates from the chassis of an automobile comprising a pair of brackets attachable to the rear end of the chassis frame of said automobile and each presenting an upwardly disposed sleeve-like portion, a pair of upright posts having their bottom ends fitting in said respective sleeve-like portions, means adjustably securing said posts to the inner one of said bottom plate members, and bracing members extending from said posts to the outer one of said bottom plate members.

3. In a cargo carrying attachment for an automobile, a body composed of a pair of bottom wall sections hingedly interconnected to fold one upon the other, side and end walls hingedly connected at their bottom edge portions to said bottom wall to swing between positions perpendicular to and parallel with said bottom wall, supporting means for suspending said body from the chassis frame of said automobile and bracing members extending from said last named means to the outer end portion of said body, said supporting means comprises a pair of bracket members arranged to be secured to the chassis frame of an automobile and each presenting a vertically disposed sleeve portion, a bar secured to the front end portion of said body and extending transversely therebeneath, a pair of tubular members telescopically engaging the respective ends of said bar, a pair of sleeve members secured to the outer ends of said respective tubular members and a pair of vertical posts having their lower ends fitting in said respective last named sleeve members; said sleeve members engaging in said sleeve portions.

References Cited in the file of this patent

UNITED STATES PATENTS

| | | |
|---|---|---|
| 1,916,662 | Forbes | July 4, 1933 |
| 1,941,860 | Hanson | Jan. 2, 1934 |
| 2,541,244 | Hack | Feb. 13, 1951 |
| 2,646,910 | Wiershing | July 28, 1953 |
| 2,654,516 | Edwards | Oct. 6, 1953 |

FOREIGN PATENTS

| | | |
|---|---|---|
| 350,126 | Great Britain | June 11, 1931 |